Nov. 3, 1953       J. E. MONTGOMERY ET AL       2,657,473
METHOD AND APPARATUS FOR TREATING SOLIDS
Filed Feb. 18, 1949                          2 Sheets-Sheet 1
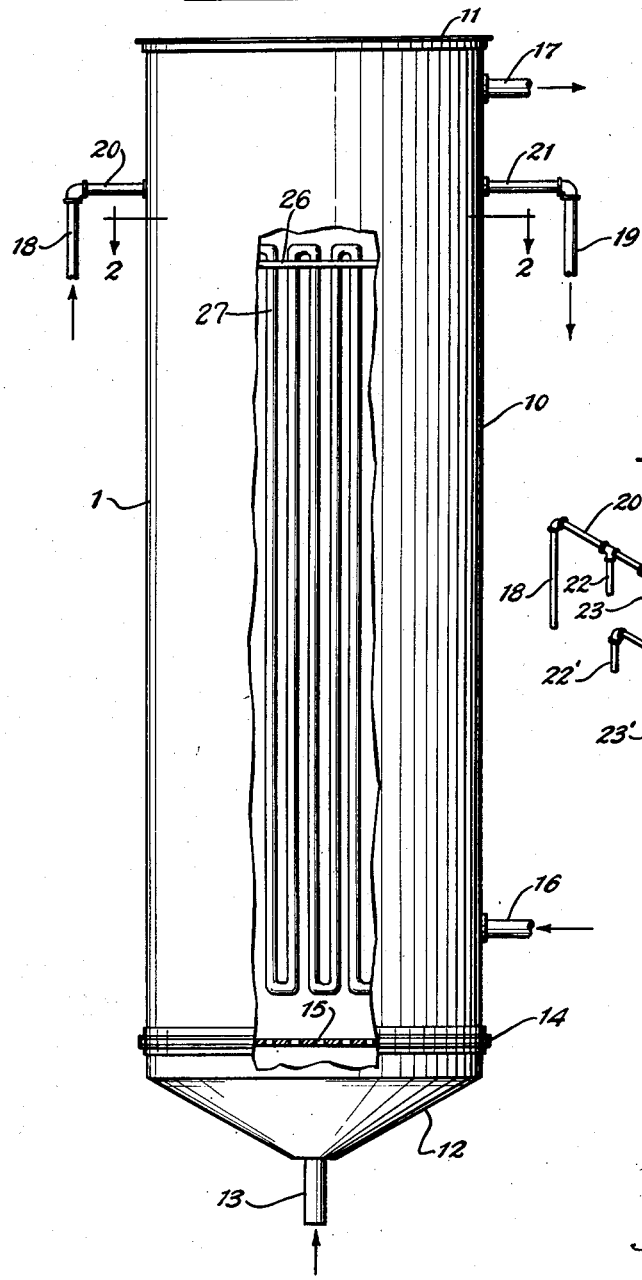
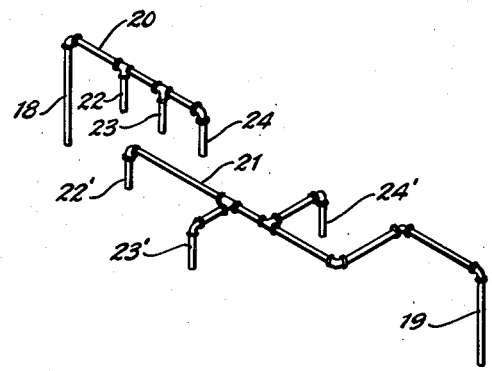
Inventor
JOHN E. MONTGOMERY.
WINSTON CUNDIFF.
By James E. Toomey
Atty.

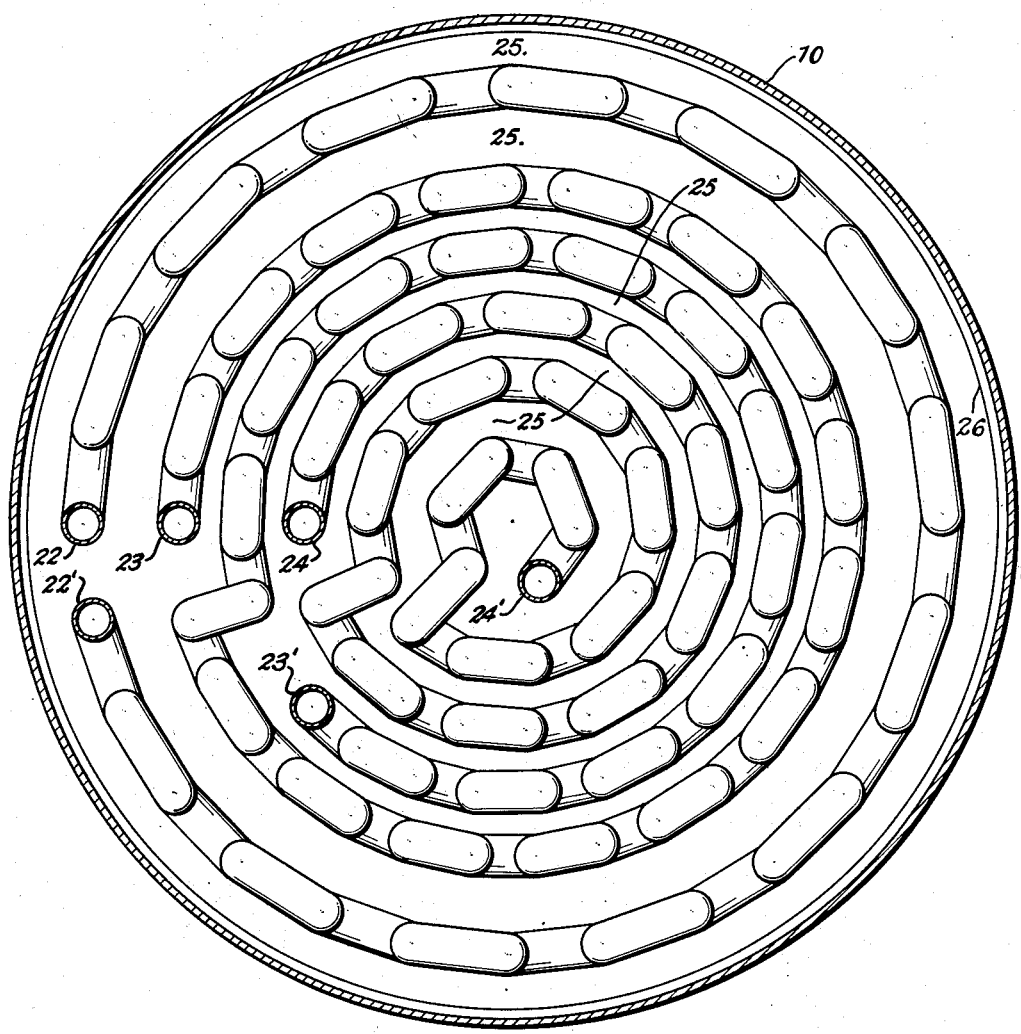

Patented Nov. 3, 1953

2,657,473

UNITED STATES PATENT OFFICE 2,657,473

METHOD AND APPARATUS FOR TREATING SOLIDS

John E. Montgomery and Winston H. Cundiff, Baton Rouge, La., assignors to Kaiser Aluminum & Chemical Corporation, a corporation of Delaware Application February 18, 1949, Serial No. 77,202

8 Claims. (Cl. 34—10)

This invention relates to an improved method and apparatus for indirect heat exchange. More particularly, the invention is directed to an improved method and apparatus for cooling or heating finely divided solids by means of indirect heat exchange wherein the solids being treated are maintained in a fluidized state.

Effecting heat exchange indirectly with a body of fluidized finely divided solids has, heretofore, been proposed. In addition, various forms of apparatus have been described for such operations. This invention is concerned with an improved method and apparatus of such nature.

It is, therefore, a primary object and purpose of the invention to provide an improved method and apparatus for effecting indirect heat exchange with finely divided solids in which an optimum coefficient of heat transfer is obtained and processing time is substantially curtailed.

A further object of the invention is to provide an improved method and apparatus for continuously cooling (or heating) finely divided solids characterized by the facility of close temperature control and uniformity of temperature in the material being treated.

A more specific object is to provide a continuous method and apparatus particularly adapted for the cooling of finely divided solids, such as hot calcined materials, by indirect heat exchange of such solids in a fluidized state wherein a maximum transfer of heat is effected with a minimum of obstruction or impedance to the flow of the fluidized solids.

The improved process generally comprises establishing and maintaining a dense turbulent body of finely divided fluidized solids within a confined zone by continuously contacting the same with a gaseous medium at fluidizing velocities, continuously feeding finely divided solids into the body of fluidized solids in one portion of the zone, continuously withdrawing treated finely divided solids from another portion of the zone, flowing the fluidized solids in contact with a plurality of separate and independent inner, intermediate and outer spaced heat transfer surfaces in the zone; and dividing the longitudinal flow of solids through the zone into a series of uniformly restricted substantially concentric streams laterally intercommunicating between the spaced heat transfer surfaces.

Apparatus of the invention particularly suitable for carrying out the above-described process generally comprises a vessel adapted to hold a body of fluidized finely divided solids, means for introducing a gaseous fluidizing medium into the vessel to establish and maintain therein a dense turbulent body of fluidized solids; means for continuously feeding finely divided solids into the body of fluidized solids in one portion of the vessel preferably in the lower portion of the vessel, means for continuously discharging treated finely divided solids from another portion of the vessel, preferably at the level of the fluidized solids body in the upper portion of the vessel, and a plurality of spaced indirect heat transfer surfaces positioned within the vessel between the feeding and discharging means so that the surfaces effectively divide the space within the vessel into a series of longitudinal uniformly restricted substantially concentric passages laterally intercommunicating between adjacent heat transfer surfaces.

In the most advantageous embodiment the indirect heating means comprises a plurality of tube bundles composed of longitudinally disposed tubes suitably connected in series. The tube bundles form a series of separate substantially concentric coils extending transversely throughout a substantial portion of the vessel. The number of coils formed by any given tube bundle may be varied, although it is contemplated that the outermost bundle forms the least number of coils and the innermost forms the greatest number of coils between the supply means or infeed header and the discharge means or header to which each tube bundle is attached at its ends for circulation of the heat exchange medium therethrough.

This construction and arrangement also provides elongated lateral communications between the several concentric passages due to the space between adjacent tubes of a given tube bundle. Thus, a maximum surface area for heat transfer is provided with a minimum of obstruction to the longitudinal flow of the fluidized solids between the inlet and outlet therefor.

Another feature of the invention provides for positioning the discharge and infeed headers for the heat exchange medium circulation in substantially the same plane near the upper portion of the vessel or the solids discharge end. Although this arrangement decreases the temperature gradient between the lower portion of the vessel where the solids are fed to the fluidized bed and the top of the bed at the discharge outlet, it effectively prevents undue variation in fluidizing gas density and insures uniform fluidization throughout the bed.

The apparatus of the invention is described in greater detail with reference to the accompanying drawings which are merely illustrative of a preferred embodiment of the invention and are not to be construed as a limitation thereof, in which Figure 1 is an elevational view of the cooling apparatus with a portion of the shell removed showing the interior arrangement of the heat exchange means and perforated gas baffle.

Figure 2 is an enlarged sectional view taken on line 2—2 of Figure 1 further showing the arrangement of the heat exchange means.

Figure 3 is a perspective view of the headers and tubes connected thereto for circulating the heat exchange medium.

Referring in particular to Figure 1, the cooling vessel 1 comprises a vertically elongated cylindrical shell 10 closed at the top by means of the flanged face plate or cover 11 and provided with a substantially conical shaped bottom 12 forming a gas chamber. Gas chamber 12 is provided with a gas inlet pipe 13 for supplying the fluidizing gaseous medium at a suitable pressure and velocity to the solids in the vessel 1. A perforated gas baffle or plate 14 is interposed between shell 10 and the gas chamber 12 and is provided with a plurality of small holes 15 throughout its entire area through which fluidizing gaseous medium is uniformly and distributively introduced into the finely divided solids being treated in vessel 1.

A feed inlet 16 is positioned in shell 10 in the lower portion thereof somewhat above the baffle 14. An overflow outlet 17 for treated finely divided solids is positioned in the shell 10 in the upper portion thereof just below cover plate 11.

As shown in Figures 1 and 3, pipes 18 and 19, through which a suitable heat exchange medium is supplied to and withdrawn from vessel 1, are connected to headers 20 and 21, respectively, extending into shell 10 below overflow outlet 17 and disposed in substantially the same horizontal plane.

The arrangement of the heat exchange surfaces within the shell 10 is of particular importance for effecting a close control of temperature, a uniformity of temperature throughout the body of fluidized finely divided solids and a rapid transfer of heat or high coefficient of heat transfer. This arrangement is shown particularly with reference to Figure 2. A plurality of tube bundles or conduits 22—22', 23—23' and 24—24' are connected in parallel to infeed header 20 and discharge header 21, respectively, at spaced intervals along the lengths of the headers within the shell 10. Each tube bundle is composed of a plurality of tubes connected in series by suitable return bends. The plurality of bundles are disposed within shell 10 to form a series of separate coils extending transversely in a concentric manner from the periphery of shell 10 to its center, and each tube bundle extends longitudinally throughout the vessel 1 from below the header 20 and 21 to the lower portion of the vessel between the feed inlet 16 and the baffle 14 by means of 180° return bends. As shown in Figure 2, outer bundle 22—22' is in the form of a single coil between headers 20 and 21, while the intermediate bundle 23—23' makes two substantially concentric courses or is in the form of two coils between the headers. The inner tube bundle 24—24' is disposed in the form of three coils of diminishing radii between headers 20 and 21. The member 26 shown in Figures 1 and 2 is an annular flange located on the inside periphery of tank 10 upon which suitable means (not shown in the drawings) for supporting the tube bundles designated collectively as 27, may be mounted.

The construction and arrangement of the tube bundles in the preferred embodiment is such that the total area of heat transfer surface in each tube bundle is substantially equal. This is accomplished by varying the number of concentric courses or coils or fractions thereof formed by each bundle between the inlet header 20 and discharge header 21 depending upon the average radius of each tube bundle. This feature advantageously permits a close control of temperature and uniformity thereof within the body of fluidized solids, since for a given heat transfer coefficient the temperature of the heat exchange medium entering discharge header 21 from each tube bundle will be substantially the same.

It may be seen that the plurality of tube bundles divides the flow path of the fluidized solids into a series of narrow or uniformly restricted elongated concentric passages 25 between the feed inlet 16 and overflow outlet 17, which passages are intercommunicating longitudinally between adjacent tubes in each bundle. Thus, the tube bundles provide passages of such dimensions that all portions of the fluidized finely divided solids are in efficient heat exchange relationship with the heat exchange medium within the tubes, and the longitudinal intercommunication of these passages permits lateral movement of the finely divided solids in the dense turbulent fluidized body which is essential to maximum contact of particles therein with the heating surfaces.

The operation of the indirect heat exchange apparatus will be described with reference to the use primarily intended, namely cooling alumina prepared by calcining alumina hydrate, although the apparatus is equally applicable to effecting indirect heat exchange with any finely divided solids of the wide range of particle sizes which may be fluidized.

Hot finely divided calcined alumina at a temperature of about 400° F. is continuously charged into vessel 1 through feed inlet 16 in shell 10. A fluidizing gas, such as air, is continuously passed into gas chamber 12 through inlet 13 and is uniformly distributed throughout the finely divided alumina by means of the perforations 15 in baffle 14 between gas chamber 12 and shell 10.

A suitable heat exchange medium, in this case, water at a selected lower temperature, is continuously circulated through tube bundles 22—22', 23—23', and 24—24' from pipe 18 and header 20, the heated water discharging from the tubes through header 21 and external pipe 19. In those cases where solids at higher temperature are treated, steam is discharged from header 21 and pipe 19.

The fluidizing gas is introduced at a suitable pressure and velocity to maintain the bed of everchanging solids in a dense turbulent condition resembling a boiling liquid. The level of the body of fluidized solids is maintained at the level of overflow outlet 17 so that a continuous discharge of the finely divided solids therefrom is effected. Fluidizing gaseous medium is also discharged from outlet 17.

The fluidized alumina moves upwardly from feed inlet 16 to overflow outlet 17 through the series of longitudinally intercommunicating narrow concentric passages between the series of coils formed by the plurality of tube bundles and is effectively cooled to a discharge temperature of about 200° F.

It has been determined that the solids passing into vessel 1 may be in the form of ordinary finely divided particles which are not fluidized, or may be previously fluidized solids. With a non-fluidized solids feed through line 16, it is advantageous to maintain a substantial head of non-fluidized solids by feeding from a height substantially above the level of fluidized solids bed in vessel 1. Where the solids fed to vessel 1 are previously fluidized, entrained, or aerated with a gaseous medium the use of a pressure head may, if desired, be eliminated.

The particle size of the finely divided solids treated in the apparatus may be varied over a wide range, for example, from a few microns to about 10 mesh. However, the range of sizes for a given bed of fluidized solids is limited by the particular gas velocity at which lifting or entrainment of the smallest particles occurs. This range varies directly with increasing average particle size for solids of a given density. Suitable fluidizing gas velocities may readily be determined for solids of a given density and particle size (or range). As an illustration, gas velocities of from about 10 to about 40 cubic feet per minute per square foot of cross-sectional flow area give satisfactory results with calcined alumina having a major proportion of particles below 200 mesh in size.

The method and apparatus hereindescribed provides an improved means for indirect heat exchange, and particularly for cooling (or heating) finely divided solids, and operates at optimum efficiency of heat transfer by virtue of the several combined features thereof.

We claim:

1. A method of effecting indirect heat exchange with finely divided solids which comprises establishing and maintaining a dense turbulent body of everchanging fluidized finely divided solids within a confined zone by continuously passing a gaseous medium therethrough at a fluidizing velocity, continuously feeding finely divided solids into the body of fluidized solids below the level thereof in said zone, continuously discharging treated finely divided solids from said zone at the level of the dense turbulent body of fluidized solids, unidirectionally flowing the fluidized solids in contact with a plurality of separate and independent inner, intermediate and outer spaced heat transfer surfaces in said zone to provide substantially uniform temperatures across the fluidized solid bed, dividing the flowing solids throughout substantially the entire longitudinal flow thereof into a concentric series of uniformly restricted substantially annular streams radially intercommunicating between the spaced heat transfer surfaces.

2. A method of cooling or heating finely divided solids which comprises establishing and maintaining a dense turbulent body of everchanging fluidized solids within a vertically elongated confined zone by passing a continuously flowing stream of gaseous medium upwardly therethrough at fluidizing velocities, continuously feeding finely divided solids into the lower portion of said zone, continuously discharging treated finely divided solids from the upper portion of said zone at the level of the dense turbulent body of fluidized solids, causing said fluidized solids to unidirectionally flow in heat exchange relationship throughout the major portion of the zone with a plurality of spaced substantially concentrically disposed inner, intermediate and outer indirect heat exchange conduits supplied with a circulating heat exchange medium, and dividing substantially the entire vertical flow of fluidized solids into a concentric series of uniformly restricted elongated streams, said streams being substantially annular and radially intercommunicating between said spaced heat exchange conduits, the circulating heat exchange medium being supplied to the inner, intermediate and outer heat exchange conduits in parallel.

3. A method according to claim 2 in which the heat exchange medium within said plurality of indirect heat exchange conduits is alternately in concurrent and countercurrent flow relationship to the vertically moving fluidized solids.

4. A method according to claim 2 in which the finely divided solid material is hot calcined alumina.

5. A heat exchange apparatus for finely divided solids comprising a vertically elongated vessel adapted to hold a body of fluidized solids, means for distributively introducing a fluidizing gaseous medium upwardly into the vessel to establish and maintain therein a dense turbulent body of fluidized solids, means for continuously feeding finely divided solids into the lower portion of said vessel, means for continuously discharging treated finely divided solids from the vessel in the upper portion thereof at the level of said fluidized solids body, a plurality of indirect heat exchange tube bundles positioned within the vessel between the feeding and discharging means, said tube bundles comprising a plurality of longitudinally extending tubes connected in series by return bends, said tube bundles being disposed within the vessel so as to form a series of separate substantially concentric coils extending transversely throughout a substantial portion of the vessel, the number of coils formed by each tube bundle increasing with decreasing radius thereof, and means for circulating a heat exchange medium through said bundles.

6. A heat exchange apparatus for finely divided solids comprising an elongated substantially cylindrical vessel adapted to hold a body of fluidized finely divided solids, means for introducing a gaseous medium into the vessel to establish and maintain therein a dense turbulent body of fluidized solids, means for continuously feeding finely divided solids into the lower portion of the vessel, means for continuously discharging treated finely divided solids from the upper portion of said vessel at the level of said fluidized solids body, indirect heat exchange means positioned within said vessel between the feeding and discharging means comprising a plurality of heat exchange tube bundles, means within the upper portion of said vessel for supplying and withdrawing a heat exchange medium from opposite ends of said bundles, said tube bundles comprising a plurality of longitudinally extending tubes connected in series and being disposed within the vessel so as to form a series of separate substantially concentric coils extending transversely from near the periphery of the vessel to the center thereof whereby the space within the vessel is divided into a series of restricted substantially concentric longitudinal passages, said passages laterally intercommunicating between adjacent tubes in each coil.

7. A heat exchange apparatus according to claim 6 in which each tube bundle has substantially the same area of heat transfer surface.

8. A heat exchange apparatus according to claim 6 in which the heat exchange medium supplying means and withdrawing means are positioned in substantially the same horizontal plane in the upper portion of said vessel whereby the heat exchange medium alternately flows concurrent then countercurrent to the flow of fluidized solids.

JOHN E. MONTGOMERY.
WINSTON H. CUNDIFF.

References Cited in the file of this patent

UNITED STATES PATENTS

| Number | Name | Date |
|---|---|---|
| 1,394,692 | Stocker | Oct. 25, 1921 |
| 1,840,857 | Testrup et al. | Jan. 12, 1932 |
| 1,868,512 | Ahlmann | July 26, 1932 |
| 1,990,608 | Lucas et al. | Feb. 12, 1935 |
| 2,014,764 | Gram | Sept. 17, 1935 |
| 2,355,373 | Hankison | Aug. 8, 1944 |
| 2,383,636 | Wurth | Aug. 28, 1945 |
| 2,433,798 | Voorhees | Dec. 30, 1947 |
| 2,500,519 | Clark | Mar. 14, 1950 |
| 2,536,099 | Schleicher | Jan. 2, 1951 |
| 2,558,206 | Baird | June 26, 1951 |